Jan. 12, 1943. W. L. JAMES 2,308,477
AIRCRAFT
Filed July 2, 1940
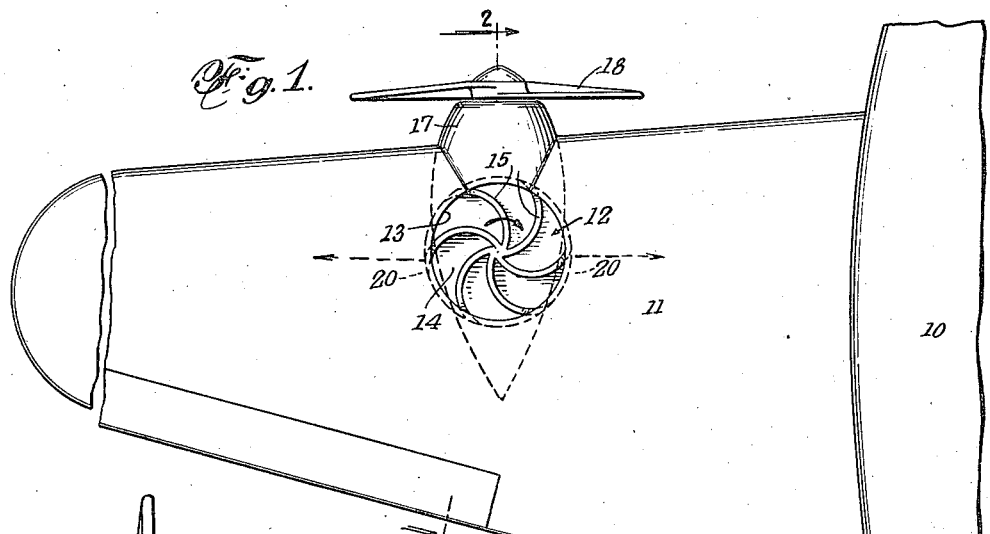
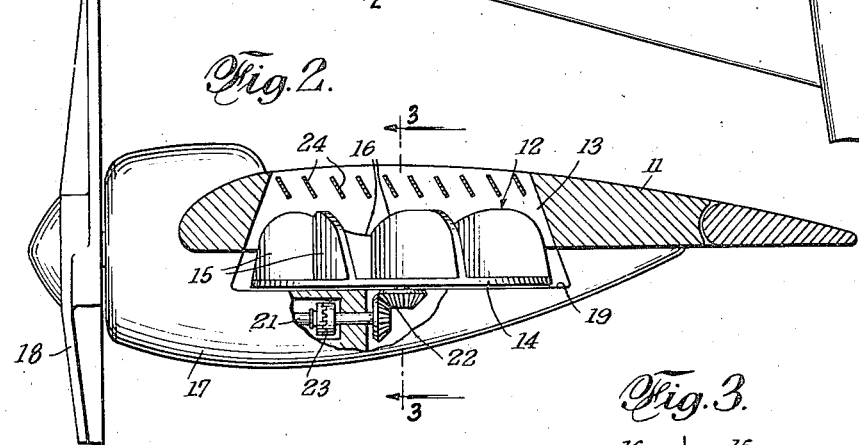
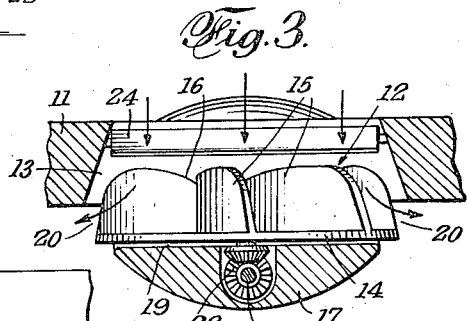
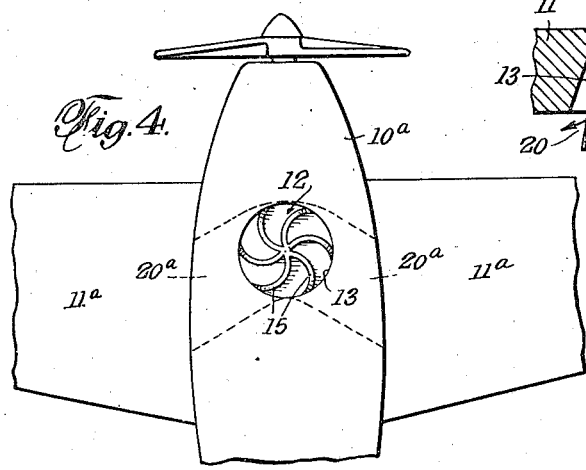
INVENTOR
WILLIAM L. JAMES
BY Patented Jan. 12, 1943

2,308,477

UNITED STATES PATENT OFFICE 2,308,477

AIRCRAFT

William L. James, New York, N. Y., assignor of one-third to Peter Spedalieri, New York, N. Y.

Application July 2, 1940, Serial No. 343,589

2 Claims. (Cl. 244—12)

The present invention relates to aircraft and more particular to heavier than air machines having wings for their support in flight.

The general object of the invention is to provide a wing structure for heavier than air aircraft whereby increased lift is obtained at any time but particularly during taking-off and landing.

Another object of the invention is to provide means incorporated in a wing structure for decreasing air pressure on the upper wing surface and increasing air pressure on the lower surface thereof.

A further object is to provide means for transferring air pressure from the upper surface to the lower surface of an aircraft wing.

A still further object of the invention is to provide means for directing air pressure drawn from the top of a wing to the bottom thereof in a lateral direction along the length of said wing.

Yet a further object is to provide means for controlling the degree of transfer of air pressure from the top surface to the bottom surface of the wing.

The foregoing objects and other objects, features and advantages of the invention will be more clearly set forth or will become evident from the following specification in which the details and principles of the invention are described.

In the drawing which illustrates exemplary forms of the invention and which forms the basis for the specification:

Fig. 1 is a top plan view of an airplane wing, partly broken, and incorporating an embodiment of the invention;

Fig. 2 is an enlarged cross-sectional view as taken along the plane of the line 2—2 of Fig. 1;

Fig. 3 is a cross-sectional view taken on Fig. 2 in the plane of the line 3—3;

Fig. 4 is a plan view, partly broken, of an aircraft incorporating an alternate form of the invention.

In that embodiment of the invention which is illustrated in Figs. 1, 2 and 3, a conventional airplane having a fuselage 10 and wings 11 is shown, the drawing illustrating one of said wings, the other being similar.

As is well known, airplane wings are designed to obtain low pressure on the upper surfaces and relatively high pressure on their lower surfaces. In this manner lift is imparted to the airplane which in flight is sustained by this pressure differential. The greater the air speed, the greater is the pressure differential and, hence, lift. As the air speed drops, the lift factor lessens until the pressure differential is unable to maintain the airplane in flight.

For the above reasons, high take-off and high landing speeds are necessary to maintain an airplane in proper trim during these operations. As can be understood, the safety factor increases if the pressure differential can be maintained at a high value at relatively low take-off and landing speeds.

To this end, the invention contemplates the provision of means for effecting a transfer of pressure from the top surface to the bottom surface of a wing.

In the present instance, this means comprises a pressure transfer member 12 in the form of a centrifugal blower or fan positioned at a suitable portion of the wing 11 and partially in an opening 13 therein.

The pressure transfer member 12 is preferably positioned at the point of greatest lift of the wing. Hence, its exact position will vary in accordance with the wing design. According to present practice, this point would be approximately one-third of the wing width from the leading edge thereof, this position being shown in the drawing.

The member 12 preferably comprises a horizontally disposed disc 14 provided with curved impeller vanes 15 on its upper face. The vanes are arranged and designed for maximum efficiency and minimum weight and for this purpose are reduced in height at 16 as they approach the center of the disc 14.

The opening 13 is formed frusto-conical to provide a small top opening and a relatively larger bottom opening in the wing and the transfer member 12 is positioned so that its upper portion is disposed within the opening while its lower portion is therebeneath.

While the transfer members may have no direct association with the propulsion means of the aircraft, it is preferred to incorporate them in the structures which house the motors. As shown particularly in Fig. 2, a motor nacelle 17 is shown as built into the wing 11, the motor therein (not shown) driving the propeller 18. The opening 13 is extended as at 19 to include that portion of the nacelle which is immediately beneath the wing to form the lateral ports 20 which expose the transfer member between the wing and the nacelle 17.

Means are provided to rotate the pressure transfer member at a relatively high rate of speed as by means of the shaft 21 which is driven by the motor, and gearing such as 22. A clutch 23 is employed for cutting in the member 12 at a desired time in the flight of the airplane.

During flight, when it is desired to obtain a transfer of pressure from the top wing surface to the bottom wing surface, the clutch 23 is operated to impart the rotation of the shaft 21 to the member 12. This member, designed as an exhaust fan, draws air from the wing top through the opening 13 and forces this air through the lateral ports along the lower wing surface. Thus, there is a simultaneous air rarification at the top of the wing and air compression at the bottom thereof. This results in increased lift so that the air speed of the airplane may be reduced commensurately. This pressure transfer may, of course, be used at any time during flight. It follows then that by using the principles of the invention, airplanes may be designed with smaller wings having higher lift properties.

The rate of air pressure transfer may be controlled and varied as by means of the shutters 24 which may be under continuous control or automatically operable as by governor means driven by the transfer member 12. The use of this latter means is, of course, optional.

As shown in Fig. 4, the air pressure transfer member may be installed in the fuselage 10ª of the airplane, the ports 20a being arranged to direct the pressure to the lower surface of both wings 11ª.

The invention has been disclosed with respect to preferred embodiments thereof, but is capable of being incorporated in various other forms within the principles of the invention and within the spirit and scope of the invention as claimed.

Having thus described the invention what is claimed as new and desired to be secured by Letters Patent, is:

1. In an aircraft having a wing including a nacelle for propulsion means for said aircraft; said wing and said nacelle being formed with a frustro-conical opening, an impeller member including a disc and curved vanes on the upper face of said disc, said impeller member being axially disposed with respect to said opening, with its disc positioned in said nacelle and below the lower surface of said wing, and with its vanes projecting partially into said wing opening, and channel means formed in said nacelle and extending from said opening through said nacelle in lengthwise direction of said wing adjacent the lower surface of the latter, whereby the impeller member is exposed between wing and nacelle to bring about transfer of air from the wing top through said channel means in lengthwise direction to and below the lower wing surface.

2. In an aircraft according to claim 1, wherein said opening is positioned at a distance of approximately one third of the wing width from the loading edge thereof.

WILLIAM L. JAMES.